US008527686B2

(12) United States Patent
Zhao et al.

(10) Patent No.: US 8,527,686 B2
(45) Date of Patent: Sep. 3, 2013

(54) ELECTRONIC DEVICE HAVING MULTIFUNCTIONAL NETWORK INTERFACE PORT

(75) Inventors: Jin-Rong Zhao, Shenzhen (CN); Guang-Jian Wang, Shenzhen (CN); Xiao-Mei Liu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 144 days.

(21) Appl. No.: 13/177,561

(22) Filed: Jul. 7, 2011

(65) Prior Publication Data

US 2012/0307438 A1 Dec. 6, 2012

(30) Foreign Application Priority Data

Jun. 2, 2011 (CN) .......................... 2011 1 0147632

(51) Int. Cl.
*G06F 13/00* (2006.01)
*G06F 13/12* (2006.01)
*G06F 13/14* (2006.01)

(52) U.S. Cl.
USPC .............. 710/301; 710/72; 710/110; 710/305

(58) Field of Classification Search
USPC .................... 710/305, 72, 110, 301
See application file for complete search history.

(56) References Cited

U.S. PATENT DOCUMENTS

| | | | | |
|---|---|---|---|---|
| 6,584,590 B1 * | 6/2003 | Bean | ............................ | 714/724 |
| 7,237,049 B2 * | 6/2007 | Kang et al. | .................... | 710/104 |
| 7,987,308 B2 * | 7/2011 | Jo et al. | ......................... | 710/301 |
| 8,112,469 B1 * | 2/2012 | Gershman | .................... | 709/200 |
| 2003/0046472 A1 * | 3/2003 | Morrow | ....................... | 710/305 |
| 2003/0120845 A1 * | 6/2003 | Chou | ............................. | 710/72 |
| 2008/0043632 A1 * | 2/2008 | Tripathi et al. | ............... | 370/251 |
| 2008/0080543 A1 * | 4/2008 | Hickox et al. | ............... | 370/419 |
| 2009/0164625 A1 * | 6/2009 | Roll et al. | .................... | 709/224 |
| 2010/0238911 A1 * | 9/2010 | Michalson et al. | .......... | 370/338 |

* cited by examiner

*Primary Examiner* — Paul R Myers
*Assistant Examiner* — Christopher A Daley
(74) *Attorney, Agent, or Firm* — Altis Law Group, Inc.

(57) ABSTRACT

An electronic device includes a network interface port, a processing unit, a network card, a serial interface, and a microchip. The network interface port connects to a debugging host or connects to an external network. The processing unit is connected to the network interface port. The network card is connected to the processing unit. The microchip is connected to the processing unit through the serial interface. The processing unit determines whether the network interface port is connected to the debugging host or connected to the external network, and selectively connects the network card or the serial interface to the network interface port according to the determination.

13 Claims, 2 Drawing Sheets

ELECTRONIC DEVICE HAVING MULTIFUNCTIONAL NETWORK INTERFACE PORT

BACKGROUND

1. Technical Field

The disclosure generally relates to electronic devices such as servers and computers, and particularly to an electronic device which has a multifunctional network interface port which can be used for both normal network communication and for debugging or updating the software.

2. Description of Related Art

When a computer microchip or other components in an electronic device fails or malfunctions, the device may be rendered unusable or the microchip or component must be replaced. Alternatively, the microchip could be debugged or have its software updated. A common method to debug or update the software of the microchip is to connect the microchip to a serial interface, and then an external debugging host is connected to the serial interface. Therefore, the debugging host can communicate with the microchip via the serial interface, and can debug or update the software of the microchip. However, nowadays, to obtain miniaturized volumes and compressed structures, many electronic devices do not provide an external serial interface port for connecting to a debugging host. Thus, it is inconvenient to debug or software-update the microchip although the electronic devices may have the serial interface mounted inside.

Therefore, there is room for improvement within the art.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the disclosure.

DETAILED DESCRIPTION

Figure 1:
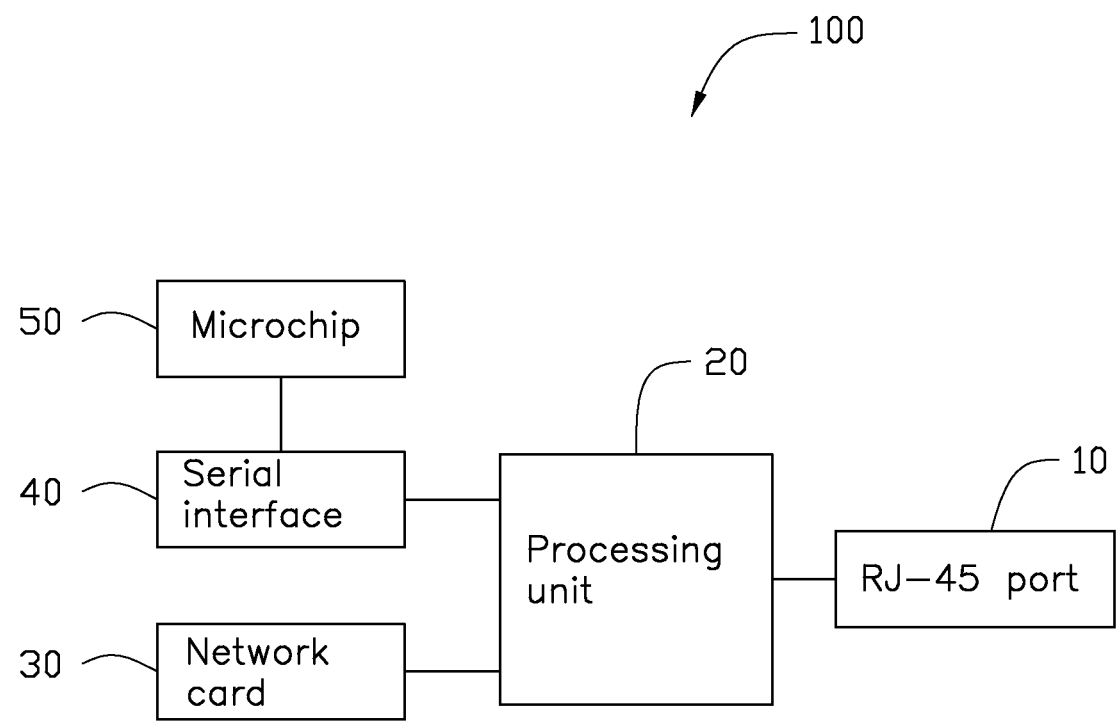
FIG. 1 is a block diagram of an electronic device, according to an exemplary embodiment.
Figure 2:
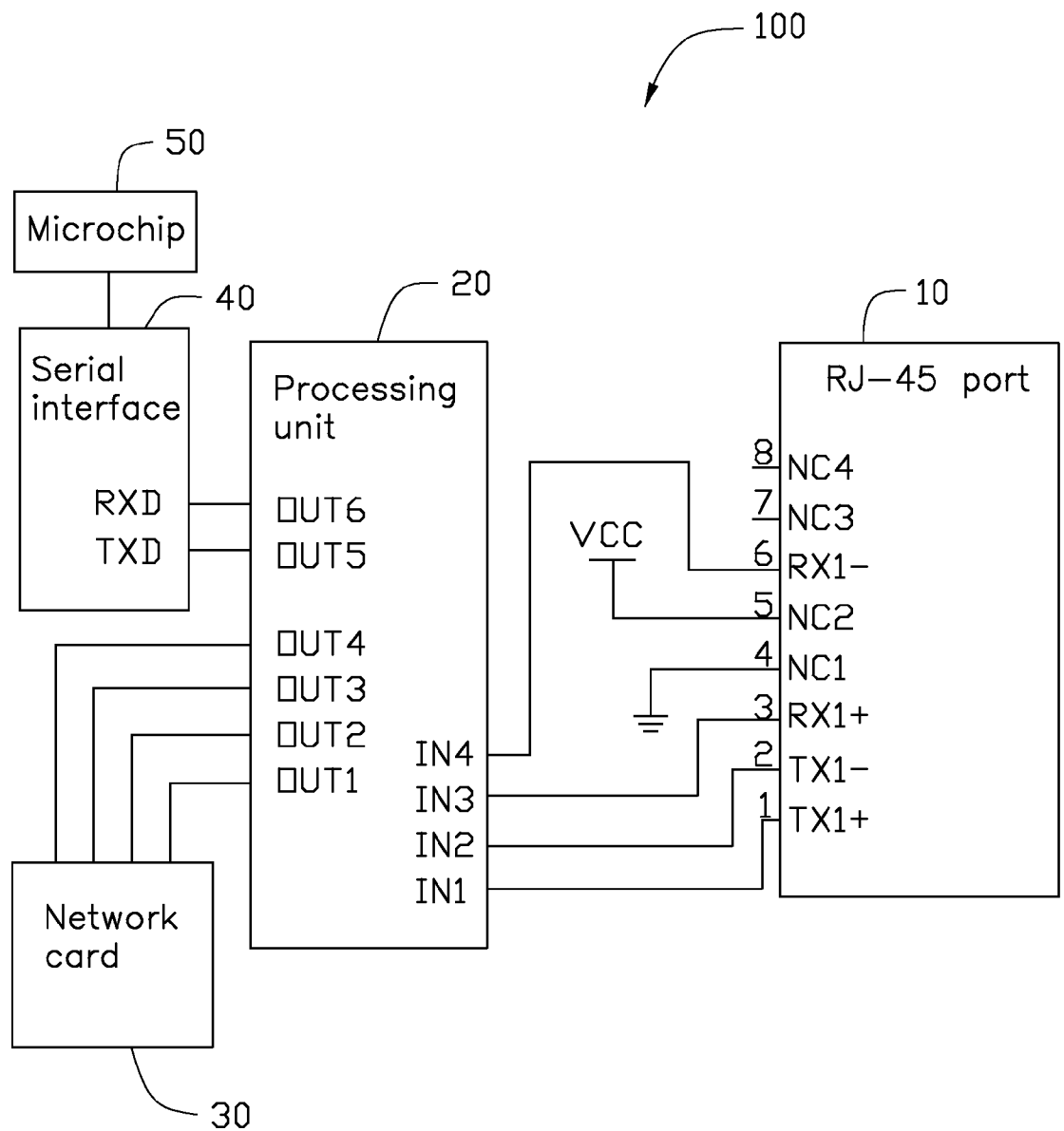
FIG. 2 is a circuit diagram of the electronic device shown in FIG. 1, according to an exemplary embodiment.

Referring to FIGS. 1 and 2, an embodiment of an electronic device 100 includes a network interface port, such as a registered jack 45 (RJ-45) port 10, a processing unit 20, such as a programmable logic controller (PLC), a network card 30, a serial interface 40 and a microchip 50 which may need to be debugged or software-updated from time to time. The microchip 50 may contain firmware.

The RJ-45 port 10 includes eight pins 1-8, and the definition of the eight pins 1-8 is shown below:

| Pin | Name | Description |
|---|---|---|
| 1 | TX1+ | Receiving signal pin |
| 2 | TX1− | Receiving signal pin |
| 3 | RX1+ | Transmitting signal pin |
| 4 | NC1 | Ground pin |
| 5 | NC2 | Power pin |
| 6 | RX1− | Transmitting signal pin |
| 7 | NC3 | free |
| 8 | NC4 | free |

Pins 1, 2, 3, 6 are connected to the processing unit 20. Pin 4 is grounded. Pin 5 is connected to a power supply VCC, such as 5 volt (V). Pins 7, 8 are free. The RJ-45 port 10 can be connected to an external network for the network card 30 or connected to a debugging host (not shown) for the microchip 50.

The processing unit 20 includes a group of input pins IN1-IN4, a group of first output pins OUT1-OUT4 and a group of second output pins OUT5-OUT6. The input pins IN1-IN4 are respectively connected to the pins 1, 2, 3, and 6, thereby obtaining signals transmitted from the RJ-45 port 10. The first output pins OUT1-OUT4 are connected to the network card 30. The second output pins OUT5-OUT6 are connected to the microchip 50 by the serial interface 40. When the RJ-45 port 10 is connected to the external network, the input pins IN1-IN4 are connected to the first output pins OUT1-OUT4. When the RJ-45 port 10 is connected to the debugging host, the input pins IN1-IN4 are switched to the second output pins OUT5-OUT6.

The processing unit 20 includes a base voltage VB preset therein, such as 3V. The processing unit 20 obtains an averaged voltage V corresponding to the signals transmitted from the RJ-45 port 10. The processing unit 20 compares the averaged voltage of signals with the base voltage and determines whether the RJ-45 port 10 is connected to the external network or the debugging host according to the comparison.

In one embodiment, if the voltage V meets the following formula: $|V|<3V$, the RJ-45 port 10 is connected to the external network. If the voltage V meets the following formula: $|V|>3V$, the RJ-45 port 10 is connected to the debugging host.

When the RJ-45 port 10 is connected to the external network, the network card 30 is connected to the RJ-45 port 10 by the processing unit 20, and can communicate with the external network.

The serial interface 40 includes a data transmitting pin TXD and a data receiving pin RXD respectively connected to the second output pins OUT5-OUT6. The serial interface 40 is also connected to the microchip 50. When the RJ-45 port 10 is connected to the debugging host, the microchip 50 is connected to the RJ-45 port 10 by the processing unit 20 and the serial interface 40. Thus, the microchip 50 can be debugged or software-updated.

In other embodiments, if the external debugging host includes a ground signal and a power signal by itself, pins 4 and 5 can be not used.

Because the RJ-45 port 10 can be used for both normal network communication and for debugging or updating the software, the need for an external serial interface port dedicated to such processes is eliminated, thus reducing costs of the electronic device as well as saving space in the device in aid of further miniaturization if desired.

It is believed that the exemplary embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. An electronic device, comprising:
   a network interface port;
   a network card;
   a serial interface;
   a processing unit, the processing unit comprising:
      a group of input pins connected to the network interface port;

a group of first output pins connected to the network card; and a group of second output pins connected to the serial interface; when the network interface port is connected to the external network, the first output pins connected to the input pins; when the network interface port is connected to the debugging host, the second output pins connected to the input pins; and a microchip connected to the processing unit through the serial interface; wherein the processing unit determines whether the network interface port is connected to a debugging host or connected to an external network, and selectively connects the network card or the serial interface to the network interface port according to the determination.

2. The electronic device of claim 1, wherein the processing unit includes a base voltage, the processing unit compares an averaged voltage corresponding to signals transmitted from the network interface port and determines whether the network interface port is connected to the external network or the debugging host according to the comparison.

3. The electronic device of claim 1, wherein the network interface port includes two receiving signal pins, two transmitting signal pins, a data transmitting pin, and a data receiving pin respectively connected to the input pins.

4. The electronic device of claim 3, wherein the network interface port further comprises a ground pin and a power pin, the ground pin is grounded; the power pin is connected to a voltage terminal.

5. The electronic device of claim 1, wherein the microchip contains firmware.

6. The electronic device of claim 1, wherein the processing unit is a programmable logic controller (PLC).

7. The electronic device of claim 1, wherein the network interface port is a registered jack 45 (RJ-45) port.

8. An electronic device, comprising:
a network interface port;
a processing unit connected to the network interface port;
a network card connected to the processing unit;
a serial interface; and
a microchip connected to the processing unit through the serial interface; wherein the processing unit determines whether the network interface port is connected to a debugging host or connected to an external network, and selectively connects the network card or the serial interface to the network interface port according to the determination; the processing unit includes a base voltage, the processing unit compares an averaged voltage corresponding to signals transmitted from the network interface port with the base voltage and determines whether the network interface port is connected to the external network or the debugging host according to the comparison.

9. The electronic device of claim 8, wherein the network interface port includes two receiving signal pins, two transmitting signal pins, a data transmitting pin, and a data receiving pin respectively connected to the input pins.

10. The electronic device of claim 9, wherein the network interface port further comprises a ground pin and a power pin, the ground pin is grounded; the power pin is connected to a voltage terminal.

11. The electronic device of claim 8, wherein the microchip contains firmware.

12. The electronic device of claim 8, wherein the processing unit is a programmable logic controller (PLC).

13. The electronic device of claim 8, wherein the network interface port is a registered jack 45 (RJ-45) port.

* * * * *